J. G. SWAIN.
BOTTOM DELIVERY SILO.
APPLICATION FILED SEPT. 27, 1916.
1,210,116.
Patented Dec. 26, 1916.
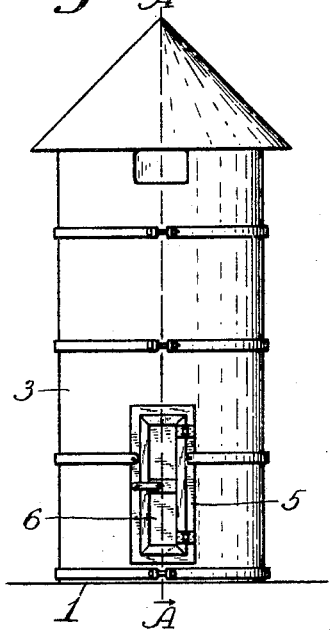
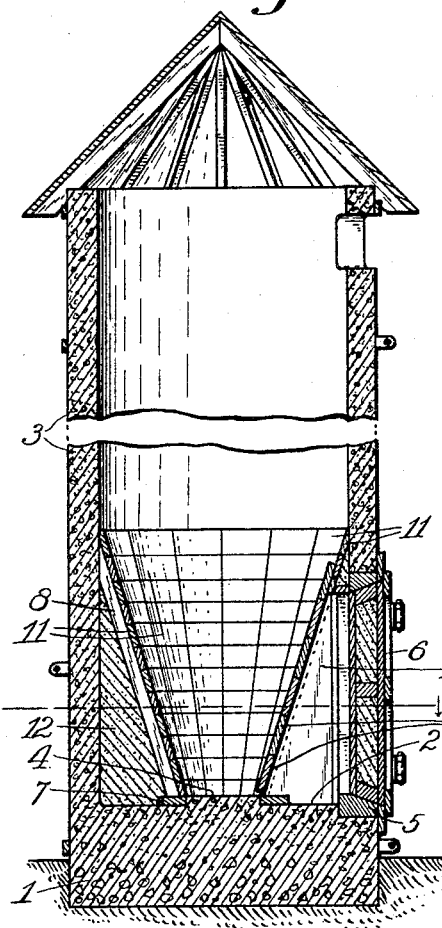
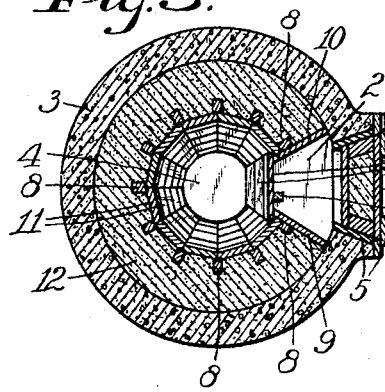
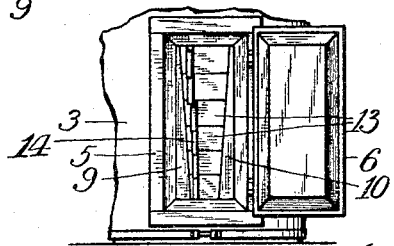
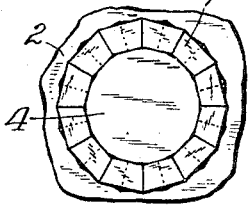
WITNESSES:
J. H. Gardner
M. E. Sparrow
INVENTOR:
Josiah G. Swain,
BY
E. T. Silvius,
ATTORNEY.

UNITED STATES PATENT OFFICE.

JOSIAH G. SWAIN, OF MOORESVILLE, INDIANA.

BOTTOM-DELIVERY SILO.

1,210,116.  Specification of Letters Patent.  Patented Dec. 26, 1916.

Application filed September 27, 1915. Serial No. 52,920.

*To all whom it may concern:*

Be it known that I, JOSIAH G. SWAIN, a citizen of the United States, residing at Mooresville, in the county of Morgan and State of Indiana, have invented a new and useful Bottom-Delivery Silo, of which the following is a specification, reference being had to the accompanying drawings, and to the letters and figures of reference marked thereon.

This invention relates to a tank-like hollow building commonly known as a silo and in which live-stock food, commonly known as silage, is kept for use as needed, the invention having reference more particularly to a silo that is so constructed as to permit the contents thereof to be removed from the lower instead of the upper portion of the bulk of silage.

An object of the invention is to provide an improved silo of such construction as to enable the stock feeder to obtain and feed the silage to cattle or live-stock without it being necessary to climb to the top of the silo, which is objectionable and more particularly in the cold season of the year, in order to obtain the silage.

Another object is to provide an improved silo of such construction that the older and better quality of silage at the bottom may be conveniently removed while leaving the remaining bulk to become more mature.

A still further object is to provide a safety feed-structure for silos that shall be adaptable to existing silos as an improvement thereto for the above-mentioned purposes, and which shall be so constructed that the stock feeder may remove the silage in safety without being exposed to inclement weather or the danger of being injured by the descending bulk of silage when the lower portions of the bulk are removed.

With the above-mentioned and other objects in view, the invention consists in a silo structure provided in the lower portion thereof with a bottom superstructure comprising a combined wall and bottom portion that is in the form of an inverted hollow cone, the smaller end of which rests upon the bottom of the silo and the larger end extends upward to the silo wall to constitute an inner inclined wall for retarding the descent of silage to the bottom, the inner wall having a doorway or aperture through which to remove the silage, and provided with a removable closure, the main wall of the structure having a corresponding doorway and door; and the invention consists further in the parts, and combinations and arrangements of parts, as hereinafter particularly described and further defined in the accompanying claims.

Referring to the drawings,—Figure 1 is a front elevation of the improved silo; Fig. 2 is a vertical section on the line A A on Fig. 1, a portion of the silo being broken away; Fig. 3 is a horizontal section on the line B B on Fig. 2; Fig. 4 is a fragmentary front elevation of the silo with the main door in open position; and, Fig. 5 is a fragmentary top plan of the bottom or floor of the silo.

Similar reference characters on the different figures of the drawings indicate like parts or features of construction herein referred to.

The silo structure generally may be variously constructed and of various materials, the structure essentially comprising a suitable foundation 1 upon which is a silo bottom or floor 2 and a main wall 3 of suitable height, the latter preferably being cylindrical. Preferably the bottom or floor has an elevated floor portion 4 arranged centrally with respect to the main wall 3. The lower portion of the main wall is provided adjacent to the bottom or floor 2 with a suitable door frame 5 to constitute a main doorway, a main door 6 being closely fitted into the frame and hinged thereto, and the door may be secured in closed position by any suitable device. A suitable frame 7 is placed upon the bottom or floor 2 and may suitably be composed of wood and annular in form so as to extend about the elevated portion 4 and be thereby secured in central position relatively to the main wall. A hollow truncated cone is suitably constructed and secured in inverted position to the frame 7 to constitute a funnel-shaped combined inner wall and bottom portion, and it preferably comprises a plurality of studs 8 secured to the frame 7 and extending upwardly and radially to the inner side of the main wall 3 above the plane of the top of the main doorway, the various proportions being such as to permit of the desired degree of inclination to the studs. A partitional wall 9 is secured to one of the studs and extends to one side of the main doorway, a similar partitional wall 10 being secured to the adjacent opposite stud and extending to the opposite side of the main doorway to form a doorway for the inner wall and a gangway in which the stock feeder may work, and through which to draw the silage for delivery through the main doorway. The studs are covered with suitable material, such as boards 11 fitted together and secured to the inner sides of the studs 8 to complete the inclined inner wall. The space between the main wall and the inner wall and bottom portion is filled with suitable packing 12, such as sawdust, to exclude air from the interior of the space within the inner wall. The doorway of the inner wall is provided with a suitable removable closure which preferably comprises a suitable number of wooden boards 13 superimposed on edge on the silo bottom or floor or on the frame 7 and extending behind the partitional walls 9 and 10, the outer side of each board preferably having a suitable lug 14 thereon to be engaged by a crowbar or the like for forcing the board endwise when it is desired to remove it for gaining access to the silage.

It will be understood that various modifications may be made as to details of construction, and that the combined wall and bottom portion may be constructed and inserted in not only new but in old silos.

In practical use, the silo having been filled as is customary, with the doorways tightly closed the upper portion of the silage need not be disturbed with consequent risk of that remaining on top deteriorating or becoming unfit for use. When it is desired to feed the cattle or live-stock the outer door is opened, after which one or more of the lowermost boards 13 may be removed first and subsequently others farther up may be removed if necessary to work down a sufficient quantity of the silage. When removing a board it may be forced endwise until one of its ends can be withdrawn from behind the back of the doorway frame, after which the board may be pulled out from behind the opposite portion of the frame. On removal of the silage from the bottom or floor portion 4 the bulk of silage should gradually descend of its own weight, or the under portions thereof may be raked loose and removed by the attendant without it being necessary for him to enter the chamber under the bulk of silage. In case the silage descends too freely for the needs of the cattle, such as may pass through the doorway of the inner wall may remain in the passageway between the inner door and the outer door and permit the outer or main door to be closed. The attendant can be sheltered from cold while working between the outer and inner doorways.

Having thus described the invention, what is claimed as new is—

1. A silo appliance comprising an annular supporting frame, a plurality of studs secured to the frame and extending upwardly and outwardly therefrom, two partitional walls secured to two adjacent ones of the studs and extending outwardly therefrom, and a covering secured to the inner sides of the studs and covering the spaces between them excepting the space between the two adjacent ones.

2. A silo comprising a bottom, a main wall and an inclined inner wall supported on the bottom, the upper portion of the inner wall having support against the inner side of the main wall, the lower portion of the inner wall being spaced apart from the main wall to provide a workman's shelter chamber, there being a doorway in each of the walls communicating with the chamber.

3. A silo comprising a bottom, a main wall and an inner wall on the bottom, the inner wall being funnel-shaped and having a doorway in the side of its lower smaller portion, the main wall having a doorway in its lower portion opposite the doorway of the inner wall, there being a passageway to shelter a workman between the two doorways, a closure for the doorway of the main wall, a closure for the doorway of the inner wall, and a packing on the bottom and between the inner wall and the main wall.

4. A silo comprising a bottom, a vertical main wall on the bottom with a main doorway therein adjacent to the bottom, a door hinged to the main wall to close the doorway, an inner wall within the main wall and extending at an inclination from the bottom of the silo upwardly and outwardly to the main wall above the main doorway to provide a workman's safety chamber, the inner wall having a doorway therein opposite to the main doorway, and a plurality of superimposed closure boards in the doorway of the inner wall and removably connected with the inner wall.

In testimony whereof, I affix my signature in presence of two witnesses.

JOSIAH G. SWAIN.

Witnesses:
  E. T. SILVIUS,
  M. E. SPARROW.

Copies of this patent may be obtained for five cents each, by addressing the "Commissioner of Patents, Washington, D. C."